(12) United States Patent
Lu et al.

(10) Patent No.: US 9,007,788 B2
(45) Date of Patent: Apr. 14, 2015

(54) EXCITATION CONTROL CIRCUIT AND ELECTRICALLY EXCITED WIND POWER SYSTEM HAVING THE SAME

(75) Inventors: Yan-Song Lu, Shanghai (CN); Chang-Yong Wang, Shanghai (CN); Jun Chen, Shanghai (CN); Xue-Xiao Luo, Shanghai (CN); Jun-Sheng Mu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 254 days.

(21) Appl. No.: 13/612,857

(22) Filed: Sep. 13, 2012

(65) Prior Publication Data

US 2013/0182466 A1    Jul. 18, 2013

(30) Foreign Application Priority Data

Jan. 16, 2012  (CN) .......................... 2012 1 0012818

(51) Int. Cl.
*H02M 7/53* (2006.01)
*H02J 3/38* (2006.01)
*H02P 9/30* (2006.01)

(52) U.S. Cl.
CPC ................. *H02J 3/386* (2013.01); *H02P 9/305* (2013.01); *H02P 2101/15* (2015.01); *Y02E 10/763* (2013.01)

(58) Field of Classification Search
USPC ........... 363/16–20, 34, 37, 39, 41, 89, 95, 97, 363/98; 318/116, 434, 701, 293; 290/43, 290/44, 31
See application file for complete search history.

(56) References Cited

U.S. PATENT DOCUMENTS

| | | | |
|---|---|---|---|
| 6,670,721 B2 * | 12/2003 | Lof et al. ........................ | 290/44 |
| 6,940,735 B2 * | 9/2005 | Deng et al. ...................... | 363/37 |
| 6,977,475 B2 * | 12/2005 | Kuribayashi et al. .......... | 318/140 |
| 7,622,815 B2 | 11/2009 | Rivas et al. | |
| 7,778,045 B2 * | 8/2010 | Alexander ...................... | 363/13 |
| 7,952,232 B2 * | 5/2011 | Burra et al. .................... | 307/64 |

FOREIGN PATENT DOCUMENTS

| | | |
|---|---|---|
| CN | 101753086 A | 6/2010 |
| TW | 201031817 A | 9/2010 |

* cited by examiner

*Primary Examiner* — Rajnikant Patel
(74) *Attorney, Agent, or Firm* — CKC & Partners Co., Ltd.

(57) ABSTRACT

The present invention provides an excitation control circuit and the electrically excited wind power system having the same. The excitation control circuit includes a plurality of full-power converters, each of which has a generator-side converter and a grid-side converter; a DC excitation module including a plurality of DC-DC converters; and a control module, controlling or switching any DC-DC converter working normally, and controlling excitation switch turning ON or turning OFF.

20 Claims, 5 Drawing Sheets

EXCITATION CONTROL CIRCUIT AND ELECTRICALLY EXCITED WIND POWER SYSTEM HAVING THE SAME

RELATED APPLICATIONS

This application claims priority to Chinese Application Serial Number 201210012818.6, filed Jan. 16, 2012, which is herein incorporated by reference.

BACKGROUND

1. Field of Invention

The present invention relates to the field of wind power generation technology. More particularly, the present invention relates to an excitation control circuit and an electrically excited wind power system including the excitation control circuit.

2. Description of Related Art

Currently, with the increasingly serious energy crisis and environmental problems, countries all over the world are vigorously developing renewable energy business, such as wind power generation and solar electrical energy generation. Taking the wind power generation as an example, from a stall-regulated wind power system to a variable-speed-and-constant-frequency (VSCF) wind power system, and from a wind power system with a gearbox to a direct-drive wind power system without the gearbox, the installed capacity of wind power generation in China grows rapidly. Specifically, with a continuously increasing unit capacity of a current wind power generator, the VSCF technology gradually plays a dominant role. In a current megawatt wind turbine generator, the gearbox is a component with a relatively high damage rate, so that the direct-drive wind power system without the gearbox receives more emphasis and development due to its advantages of low noise, long turbine operation time, and low cost for operation and maintenance.

In general, a direct-drive wind power system mainly has two manners including permanent magnetism and electrical excitation. However, currently, the rare earth material is expensive, which directly increases the manufacturing cost of a permanent-magnet wind power system. Comparatively, the electrically excited wind power system gradually becomes the main trend in research and development for technical professionals.

In the prior art, the structure of an electrically excited wind power system is to rely on the DC bus of a single set of back-to-back converters (formed from a generator-side converter and a grid-side converter) to provide the input voltage of a DC-DC converter, and to output an appropriate DC voltage by the DC-DC converter through a bucking process, so as to supply power to the excitation device. However, when the DC-DC converter is out of order, the wind power generator is very likely to be suddenly de-excited to cause the torque to disappear, such that the converter cannot provide a brake torque to the wind power generator, thus damaging components in the wind power generation system. In another structure of an electrically excited wind power system, through the AC voltage of the power grid, a main excitation switch, an industrial frequency transformer and a controlled rectifier bridge are sequentially arranged to output a rectified DC voltage which is then directly provided to a DC-DC converter, and thereafter an appropriate DC voltage is outputted by the DC-DC converter through a bucking process so as to supply power to the excitation device. However, the industrial frequency transformer has a big volume and high cost. More seriously, when the voltage of the power grid has voltage drop or power down, the DC input voltage of the DC-DC converter disappears, and the wind power generator is suddenly de-excited, thus causing an abrupt torque change.

In view of the foregoing, there more or less exists the condition that the wind power generator is suddenly de-excited to cause the torque to disappear in the conventional electrically excited wind power system, which significantly reduces the reliability of electrical excitation and the operation stability of the system. In view of this, those in this industry are endeavoring to find ways to design a reliable excitation control circuit for improving the working stability of the excitation device and ensuring that the magnetic filed not to disappear suddenly.

SUMMARY

In order to overcome the above deficiencies of the conventional electrically excited wind power system, the present invention provides an excitation control circuit and an electrically excited wind power system having the excitation control circuit.

An aspect of the present invention is to provide an excitation control circuit used in an electrically excited wind power system, the excitation control circuit including a plurality of full-power converters, a DC excitation module and a control module. Each of the full-power converters includes a generator-side converter and a grid-side converter. The generator-side converter has an AC side and a DC side. The AC side is electrically connected to a wind power generator, and the DC side is connected to a bus capacitance in parallel. The grid-side converter has an AC side and a DC side. The AC side is electrically connected to an AC power grid, and the DC side is connected to the bus capacitance in parallel. The DC excitation module includes a plurality of DC-DC converters. An input interface of each of DC-DC converter is electrically connected to the bus capacitance of a corresponding full-power converter. An output interface of each of the DC-DC converters is connected in parallel and is electrically connected to an excitation device. The excitation current required by the wind power generator during exciting is provided by the excitation device. The control module is used for controlling or switching one of the DC-DC converters to work normally.

The excitation control circuit further includes an AC excitation module having an excitation switch and a phase-controlled rectifier bridge which are connected in series. The excitation switch is connected to the AC power grid. An output terminal of the phase-controlled rectifier bridge is connected with an output terminal of the DC excitation module in parallel. The control module controls the excitation switch to be turned on or off. The AC excitation module is redundant with the DC excitation module, and any two of the DC-DC converters are redundant with each other.

In a specific embodiment, when the voltage of the AC power grid has voltage drop or power down, the excitation control circuit through uses the DC excitation module to supply power to the excitation device.

In a specific embodiment, when one of the DC-DC converters is out of order, the control module outputs a switching control signal, such that the other of the DC-DC converters supplies power to the excitation device. Alternatively, when one of the DC-DC converters is out of order, the control module outputs a switch control signal to turn on the excitation switch, such that the AC excitation module is used to supply power to the excitation device.

A backward diode is further arranged between the input interface of each DC-DC converter and a corresponding bus capacitance.

The input terminal of each DC-DC converter has a filter unit for filtering out the voltage disturbance on a cable connected between the bus capacitance and the input terminal.

A first common-mode rejection unit is further arranged between the AC side of the grid-side converter and the AC power grid to reject a common-mode current.

A second common-mode rejection unit or a dv/dt rejection unit is further arranged between the AC side of the generator-side converter and the wind power generator to reject the common-mode current or a dv/dt voltage.

The phase-controlled rectifier bridge is a three-phase controlled rectifier bridge or a single-phase controlled rectifier bridge.

The excitation control circuit further includes a de-excitation device arranged between the output terminal of the DC excitation module and the excitation device.

Another aspect of the present invention is to provide an electrically excited wind power system. The electrically excited wind power system includes a wind power generator and an excitation device. The excitation device is used for providing the excitation current required by wind power generator during exciting, and the electrically excited wind power system further includes the aforementioned excitation control circuit.

By using the excitation control circuit and the electrically excited wind power system the present invention, the DC input voltage of the DC-DC converter is provided by each corresponding DC bus capacitance of full-power converters, and thus the excitation device is power supplied by the DC-DC converter through a bucking process, so as to implement redundant mechanisms among the DC-DC converters. Furthermore, the present invention may further use the AC excitation module to directly supply power to the excitation device, so as to perform mutual redundancy between excitation power supply manners (i.e., the AC manner from the power grid and the DC manner from the bus capacitance), thus significantly improving the reliability of electrical excitation and the operation stability of the electrically excited wind power system.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
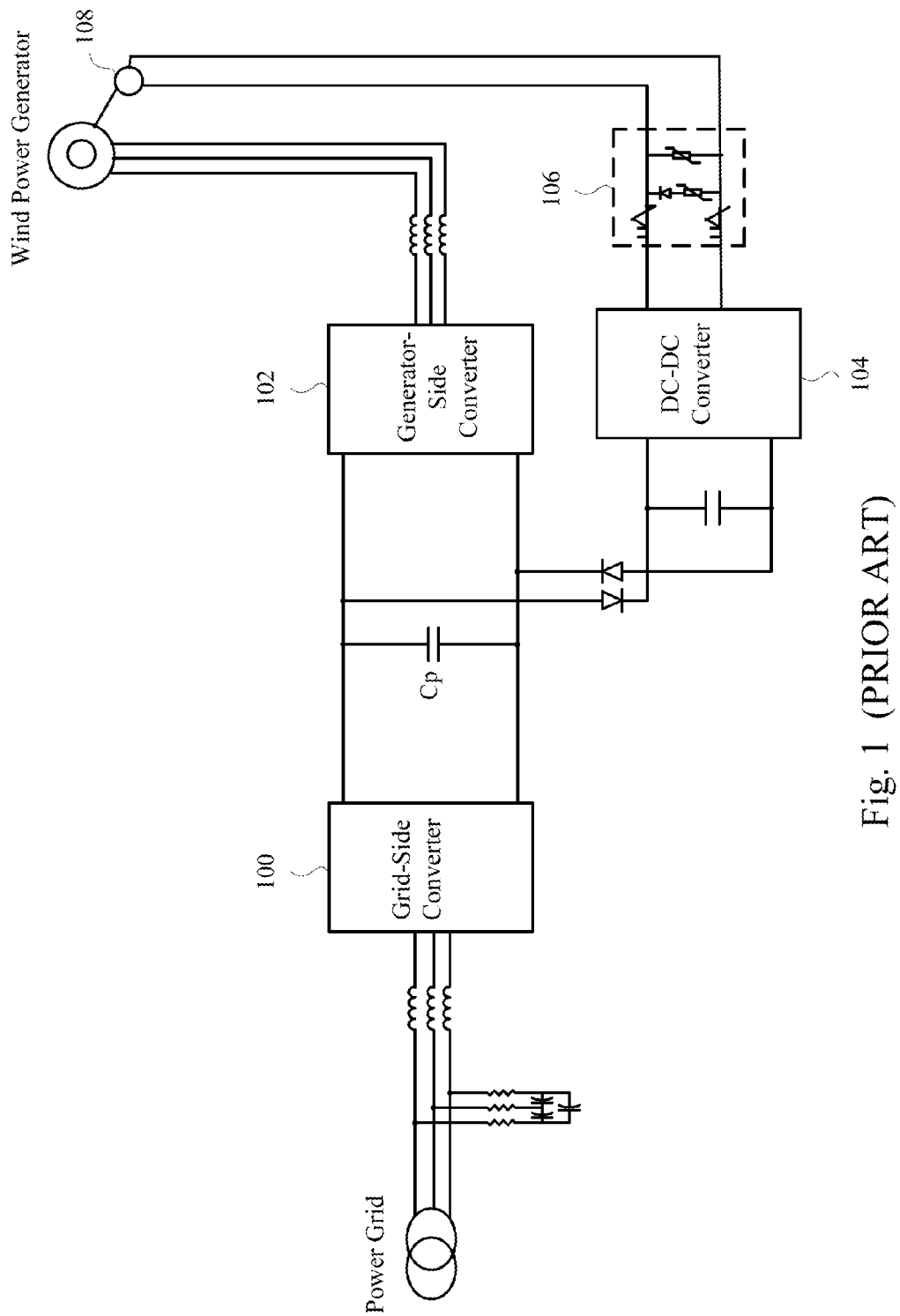
FIG. 1 illustrates a circuit structure diagram showing an excitation control circuit included in a conventional electrically excited wind power system.

In order to make the technical contents of the present invention more detailed and more comprehensive, various embodiments of the present invention are described below with reference to the accompanying drawings. Wherever possible, the same reference numbers are used in the drawings and the description to refer to the same or like parts. However, those of ordinary skills in the art should understand that the embodiments described below are not used for limiting the scope of the present invention. Moreover, the accompanying drawings are only illustrative and are not made according to the original size.

Specific implementations in various aspects of the present invention are further described in details below with reference to the accompanying drawings.

FIG. 1 illustrates a circuit structure diagram showing an excitation control circuit included in a conventional electrically excited wind power system. Referring to FIG. 1, the excitation control circuit includes a full-power converter, a DC-DC converter 104, a de-excitation device 106 and an excitation device 108. The full-power converter includes a grid-side converter 100, a generator-side converter 102, and a bus capacitance Cp arranged between the grid-side converter 100 and the generator-side converter 102.

The AC side of the grid-side converter 100 is coupled with a power grid, and the AC side of the generator-side converter 102 is coupled with a three-phase winding of a wind power generator. Furthermore, the DC-DC converter 104 is electrically connected to the bus capacitance Cp by a pair of backward diodes, so as to use a DC voltage loaded on two terminals of the bus capacitance Cp as a DC input voltage of the DC-DC converter 104. After the DC-DC converter 104 performs a bucking process on the inputted DC voltage, and the DC voltage outputted by the DC-DC converter 104 is used for supplying power to the excitation device 108. When the excitation device 108 works normally, the excitation current required for electrical excitation is outputted to the wind power generator. In FIG. 1, a de-excitation device 106 is further arranged between the DC-DC converter 104 and the excitation device 108. When the excitation device 108 is operated abnormally or the excitation current suddenly disappears, the de-excitation device 106 is used for canceling the established excitation field rapidly.

It can be seen from FIG. 1 that, the full-power converter bears the entire power outputted by the wind power generator, and the DC required for operating the excitation device 108 comes from an output terminal of the DC-DC converter 104. Once the full-power converter or the DC-DC converter 104 is out of order, the excitation device 108 will have power down suddenly, and thus the wind power generator is suddenly de-excited, further causing the torque to disappear, such that the converter cannot provide a brake torque to the wind power generator, thus damaging components in the wind power system. In view of this, such a circuit structure design brings serious potential safety risk to excitation reliability and operation stability of the electrically excited wind power system.

Figure 2:
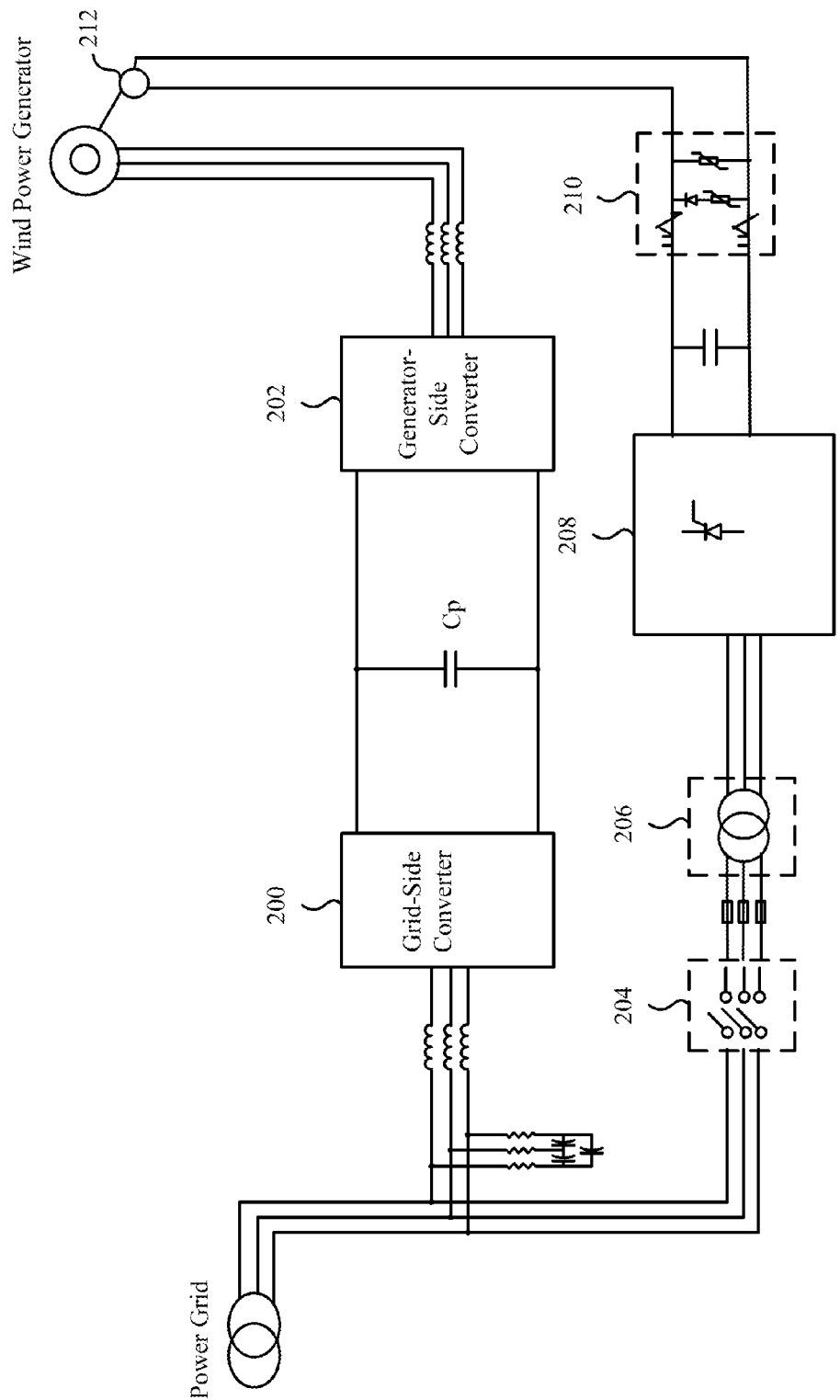
FIG. 2 illustrates a circuit structure diagram of another conventional excitation control circuit included in the electrically excited wind power system.

FIG. 2 illustrates a circuit structure diagram showing another conventional excitation control circuit included in the electrically excited wind power system. Referring to FIG. 2, the excitation control circuit includes a full-power converter, a main excitation switch 204, a low frequency transformer 206, a phase-controlled rectifier bridge 208, a de-excitation device 210 and an excitation device 212. Similarly, the full-power converter includes a grid-side converter 200, a generator-side converter 202, and a bus capacitance Cp arranged between the grid-side converter 200 and the generator-side converter 202.

The AC side of the grid-side converter 200 is coupled with a power grid, and the AC side of the generator-side converter 202 is coupled with a three-phase winding of the wind power generator. Unlike FIG. 1, the power supply of the excitation device in FIG. 2 is not provided through the bus capacitance and the DC-DC converter in the full-power converter, and instead, a power supply voltage is provided directly through an AC power grid, a low frequency transformer and a phase-controlled rectifier bridge. However, this type of excitation manner still has various disadvantages. For example, the DC power supply voltage of the excitation device 212 comes from the AC power grid, such that when the AC power grid has voltage drop or a total power down, the DC voltage at the output end of the phase-controlled rectifier bridge 208 will suddenly disappear, thus causing the excitation device 212 to have power down. Thus, the wind power generator is de-excited, thus resulting in a sudden torque change. Moreover, the low frequency transformer 206 arranged behind the excitation switch 204 and a fuse has a big volume and needs relatively high cost, which will increase the design cost of the excitation control circuit and also the predetermined space reserved for arranging and installing the circuit.

Figure 3:
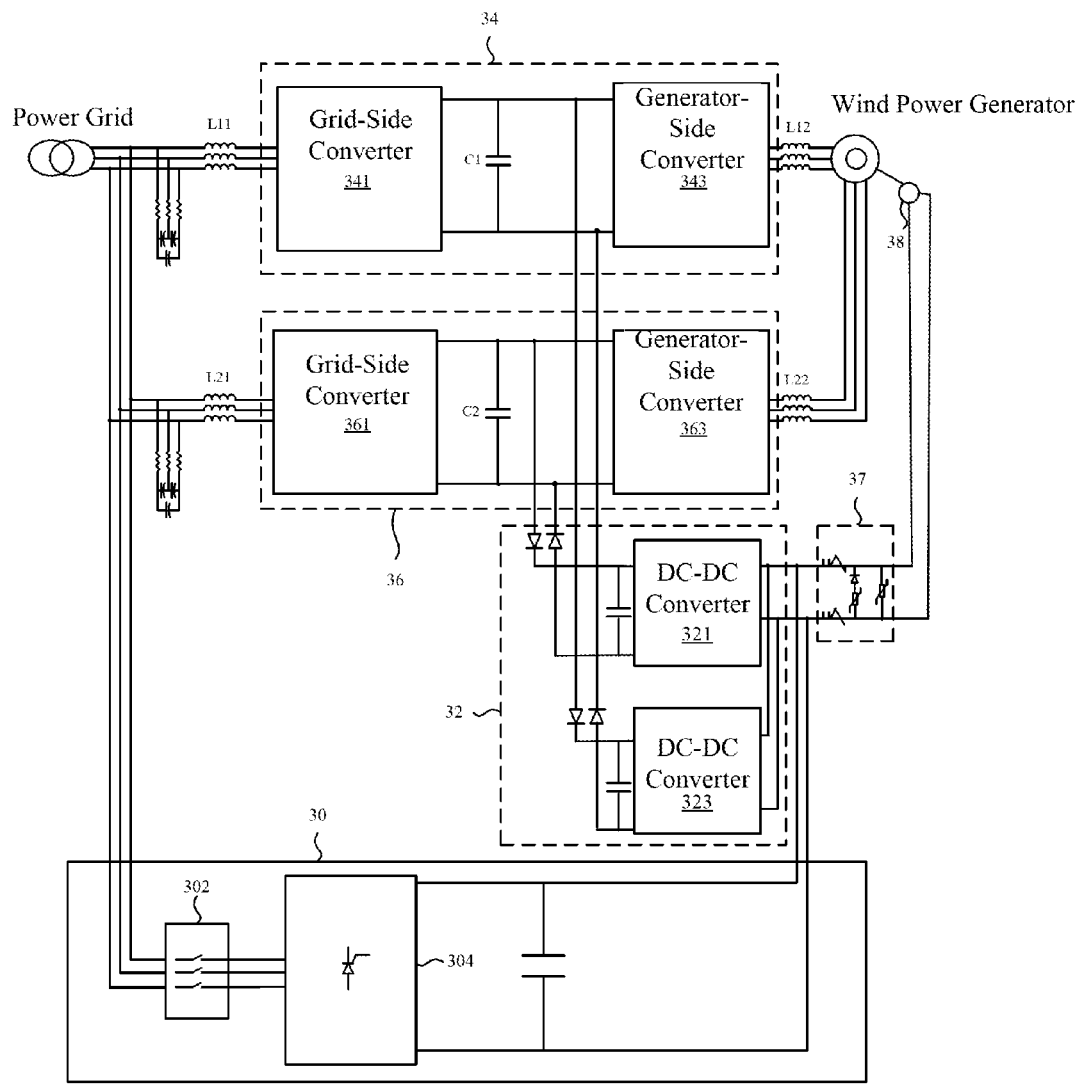
FIG. 3 illustrates a circuit structure diagram showing an excitation control circuit used in an electrically excited wind power system according to an aspect of the present invention.

In order to overcome the disadvantages of the excitation control circuit shown in FIGS. 1 and 2, FIG. 3 illustrates a circuit structure diagram showing an excitation control circuit used in an electrically excited wind power system according to an aspect of the present invention.

Referring to FIG. 3, the excitation control circuit includes a DC excitation module 32, full-power converters 34 and 36, and an excitation device 38. Moreover, the excitation control circuit further includes a de-excitation device 37 arranged between the output terminal of the DC excitation module 32 and the excitation device 38, such that when the excitation device 38 is operated abnormally or the excitation current suddenly disappears, the established excitation field can be canceled rapidly.

The full-power converter 34 includes a grid-side converter 341, a bus capacitance C1 and a generator-side converter 343. The full-power converter 36 includes a grid-side converter 361, a bus capacitance C2 and a generator-side converter 363. The DC input terminal of the DC excitation module 32 is electrically connected to respective capacitances C1 and C2 of the full-power converters 34 and 36, and the DC output terminal of the DC excitation module 32 is electrically connected to the de-excitation device 37.

In the full-power converter 34, the AC side of the grid-side converter 341 is electrically connected to an AC power grid, and the AC side of the generator-side converter 343 is electrically connected to a three-phase winding of the wind power generator, and both DC sides of the grid-side converter 341 and the generator-side converter 343 are connected to the bus capacitance C1. Similarly, in the full-power converter 36, the AC side of the grid-side converter 361 is electrically connected to the AC power grid, and the AC side of the generator-side converter 363 is electrically connected to another three-phase winding of the wind power generator, and both DC sides of the grid-side converter 361 and the generator-side converter 363 are connected to the bus capacitance C2. It should be understood by those skilled in the art that, the full-power converters (such as the full-power converters 34 and 36) in the excitation control circuit of the present invention are not only applicable to a wind power generator (such as the six-phase power generator, the nine-phase power generator, and the twelve-phase power generator) including multiple sets of three-phase windings, but also applicable to a three-phase power generator including only one set of three-phase windings. Correspondingly, both the AC side of the generator-side converter 343 in the full-power converter 34 and the AC side of the generator-side converter 363 in the full-power converter 36 are electrically connected to the same three-phase winding of the three-phase power generator. The technical solution of this alternative embodiment is also included in the scope of the present invention.

The DC excitation module 32 includes DC-DC converters 321 and 323. The DC input terminal of the DC-DC converter 321 is electrically connected to the bus capacitance C1, and the DC input terminal of the DC-DC converter 323 is electrically connected to the bus capacitance C2, and the DC output terminals of DC-DC converters 321 and 323 are connected in parallel.

It can be known from the above that, when the wind power generator of the electrically excited wind power system requires an excitation current used for electrical excitation, the full-power converter 34 and the DC-DC converter 323 of the DC excitation module 32 are used to supply power to the excitation device 38, such that the excitation current can be generated during the operation of the excitation device 38. Alternatively, the full-power converter 36 and the DC-DC converter 321 of the DC excitation module 32 also can be used to supply power to the excitation device 38, such that the excitation current can be generated during the operation of the excitation device 38. Thus, when a DC supply voltage required for operation of the excitation device 38 is provided, the DC-DC converter 321 and the DC-DC converter 323 in the DC excitation module 32 are redundant with each other, such that when one of the DC-DC converter 321 and the DC-DC converter 323 is out of order, the other thereof can be used to output the DC supply voltage. Moreover, a pair of backward diodes is arranged between the bus capacitance C1 and the DC-DC converter 323, and also between the bus capacitance C2 and the DC-DC converter 321.

In a specific embodiment, the excitation control circuit further includes an AC excitation module 30. The input terminal of the AC excitation module 30 is electrically connected to the AC power grid, and the output terminal of the AC excitation module 30 is electrically connected to the output terminal of the DC excitation module 32. In particular, the AC excitation module 30 includes an excitation switch 302 and a phase-controlled rectifier bridge 304. For example, the phase-controlled rectifier bridge 304 is a three-phase controlled rectifier bridge or a single-phase controlled rectifier bridge. In particular, the input terminal of the excitation switch 302 is electrically connected to the AC power grid, and the output terminal of the excitation switch 302 is connected to the phase-controlled rectifier bridge 304, and the output terminal of the phase-controlled rectifier bridge 304 is connected with the output terminal of the DC excitation module 32 in parallel. When the DC excitation module 32 or the full-power converters 34 and 36 is or are out of order, the excitation switch 302 can be turned on, such that a DC voltage is outputted as the supply voltage required for operating the excitation device 38 after a phase-controlled rectifying process has been performed on an AC voltage coming from the power grid Thus, in the excitation control circuit of the present invention, the DC supply voltage required for operating the excitation device 38 may not only be provided by the DC excitation module 32, but also be provided by the AC excitation module 30. In other words, as to an excitation power supply manner, the DC excitation device 32 and the AC excitation device 30 is redundant with each other, such that when the power grid has voltage drop or total power down, the supply voltage of the excitation device 38 can still be provided by obtaining power from the bus capacitance C1 or C2.

It should be pointed out that, with respect to the excitation control circuit of the present invention, the above description has illustrated in details that the DC excitation module and the AC excitation module are redundant with each other, and the DC-DC converters in the DC excitation module are redundant with each other. In order to achieve a function of redundancy backup, the excitation control circuit further includes a control module 39. The control module 39 is used for controlling or switching either one of the DC-DC converter 321 and the DC-DC converter 323 to work normally. The control module 39 is further used for controlling the excitation switch 302 to be turned on or off, such that when the DC excitation module is out of order, by controlling the excitation switch 302 to be turned on or off, the AC power grid supplied power to the excitation device directly after a phase-controlled rectifying process, thereby preventing an abrupt torque change caused by the de-excitation of the wind power generator. Moreover, the control module 39 can further control a conduction angle of the phase-controlled rectifier bridge 304, so as to adjust the DC voltage outputted by the AC excitation module 30.

In a specific embodiment, each input terminal of the DC-DC converters 321 and 323 has a filter unit (such as a filter capacitor), so as to filter out the voltage disturbance on a cable connected between the bus capacitance C1 or C2 and a corresponding input terminal of a DC-DC converter.

In a specific embodiment, a first common-mode rejection unit, such as an inductance or a common-mode choke coil, is further arranged between the AC side of the grid-side converter in each full-power converter and the AC power grid, so as to reject the common-mode current. Referring to FIG. 3, an inductance L11 is arranged between the AC side of the grid-side converter 341 and the AC power grid, so as to reject the common-mode current, and an inductance L21 is also arranged between the AC side of the grid-side converter 361 and the AC power grid, so as to reject the common-mode current.

In another specific embodiment, a second common-mode rejection unit, such as an inductance or a common-mode choke coil, is further arranged between the AC side of the generator-side converter in each full-power converter and the wind power generator, so as to reject the common-mode current. Referring to FIG. 3, an inductance L12 is arranged between the AC side of the generator-side converter 343 and the wind power generator, so as to reject the common-mode current, and an inductance L22 is also arranged between the AC side of the generator-side converter 363 and the wind power generator, so as to reject the common-mode current.

Figure 5:
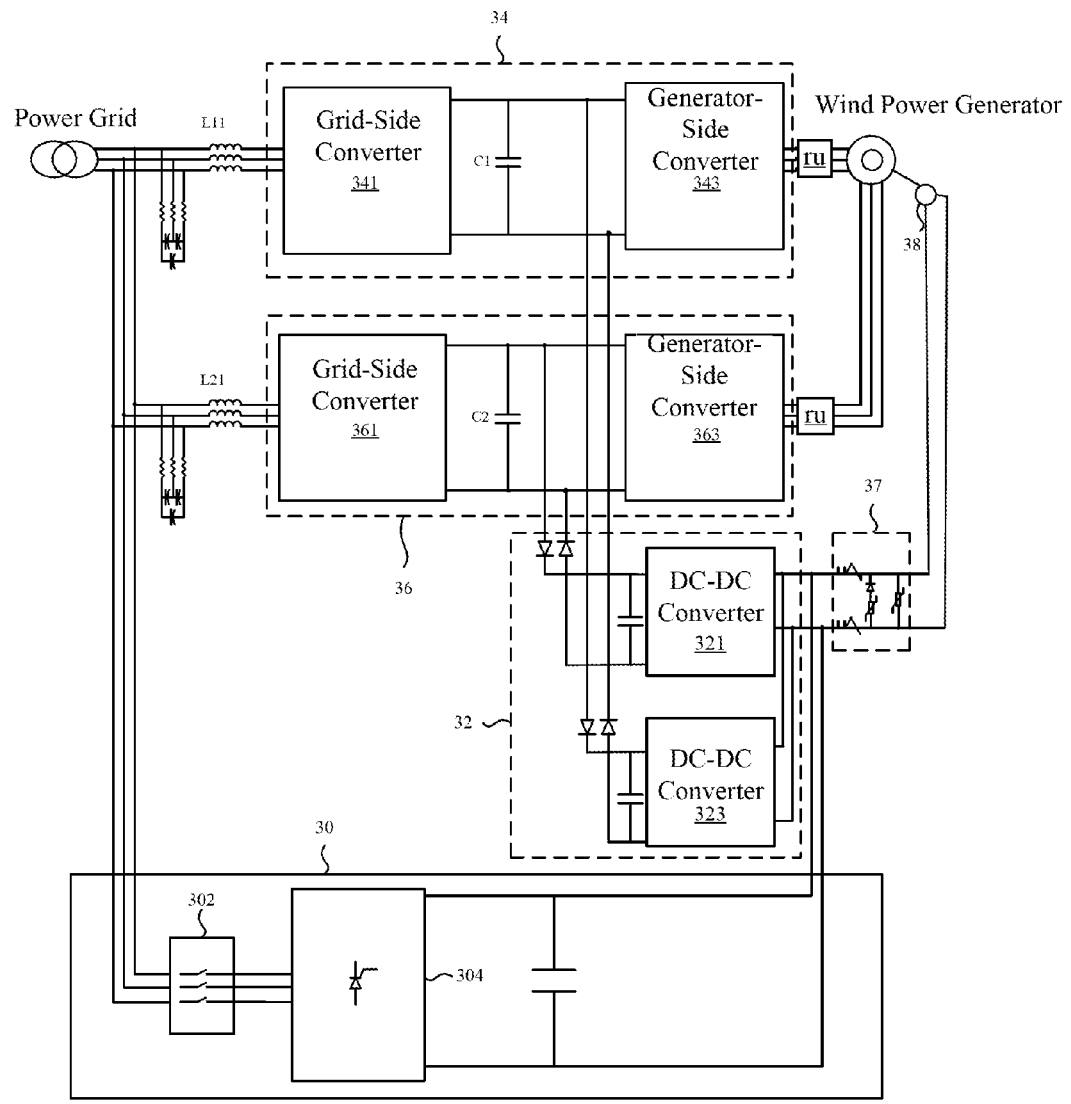
FIG. 5 illustrates a circuit structure diagram showing an excitation control circuit used in an electrically excited wind power system according to an aspect of the present invention.

In a further specific embodiment, a dv/dt rejection unit is further arranged between the AC side of the generator-side converter in each full-power converter and the wind power generator, so as to reject the dv/dt voltage. Referring to FIG. 5, dv/dt rejection unit ru is arranged between the AC side of the generator-side converter 343 and the wind power generator, so as to reject the dv/dt voltage, and dv/dt rejection unit RU is also arranged between the AC side of the generator-side converter 363 and the wind power generator, so as to reject the dv/dt voltage.

Figure 4:
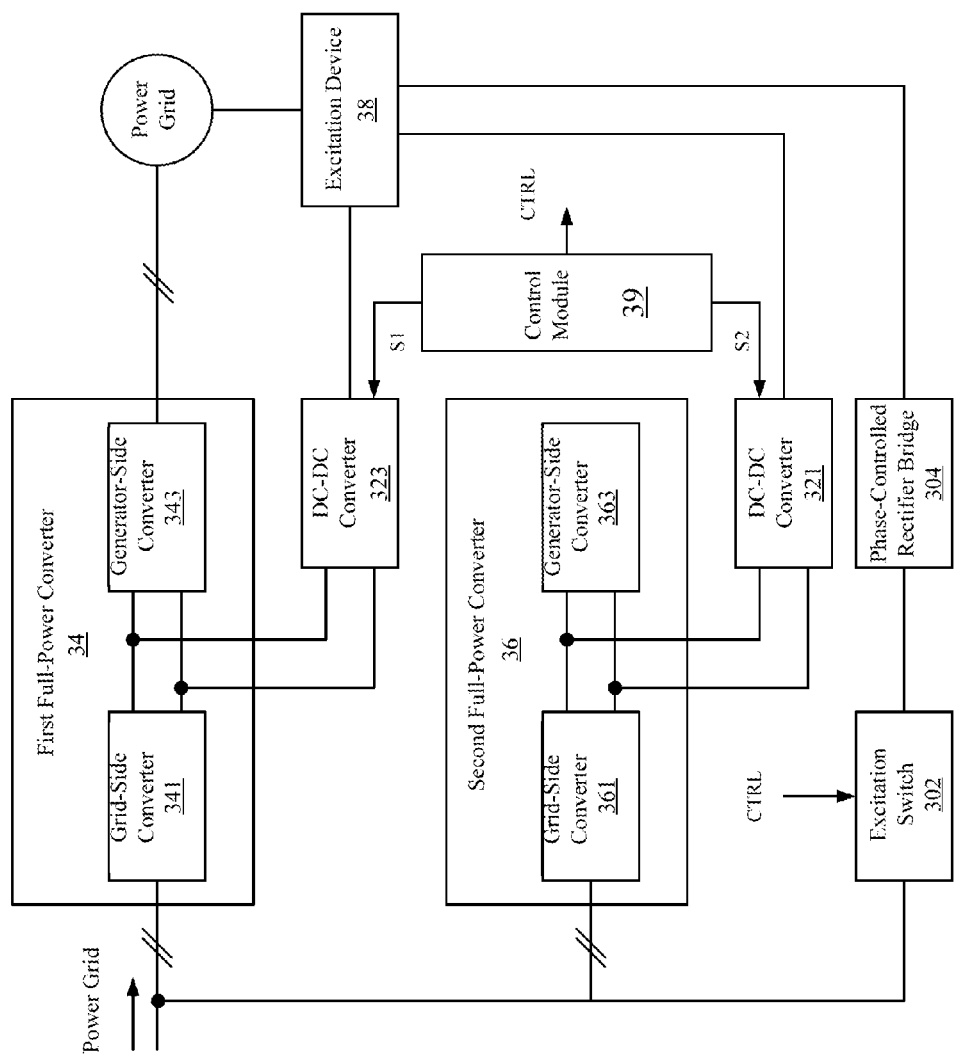
FIG. 4 illustrates a theoretical framework diagram showing a controlling process performed by the excitation control circuit shown in FIG. 3 through the control module.

FIG. 4 illustrates a theoretical framework diagram showing the controlling process performed by the excitation control circuit shown in FIG. 3 through the control module. Referring both FIG. 3 and FIG. 4, the first full-power converter 34 includes the gird-side converter 341 and the generator-side converter 343; the second full-power converter 36 includes the gird-side converter 361 and the generator-side converter 363; the DC-DC converter 323 is connected to the bus capacitance in the first full-power converter 34; and the DC-DC converter 321 is connected to the bus capacitance in the second full-power converter 36.

The control module 39 outputs control signals S1, S2 and CTRL. The control signal S1 is used for controlling the DC-DC converter 323 to be operated or stopped. The control signal S2 is used for controlling the DC-DC converter 321 to be operated or stopped, and the control signal CTRL is used for controlling the excitation switch 302 to be turning on or off.

In a specific embodiment, when the AC power grid has voltage drop or power down the excitation control circuit supplies power to the excitation device 38 by using the DC-DC converter 323 or 321 of the DC excitation module 30. For example, the control module 39 uses the control signal S1 to operate the DC-DC converter 323, so as to provide the supply voltage to the excitation device 38. Alternatively, the control module 39 uses the control signal S2 to operate the DC-DC converter 321, so as to provide the supply voltage to the excitation device 38.

In a specific embodiment, when the DC-DC converter 323 (or the DC-DC converter 321) is out of order, the control module 39 outputs a control signal S2 (or control signal S1), such that the DC-DC converter 321 (or the DC-DC converter 323) supplies power to the excitation device 38.

In another embodiment, when the DC-DC converter 323 (or the DC-DC converter 321) is out of order, the control module 39 may output a switch control signal CTRL so as to turn on the excitation switch 302, such that the AC excitation module 30 is used to supply power to the excitation device 38.

It can be known from the above that, when the supply voltage of the excitation device 38 is provided by the excitation control circuit of the present invention, if one DC-DC converter of the DC excitation module 32 is out of order during operation, the control module 39 may outputs a control signal (S1 or S2) or a switch control signal (CTRL) for enabling the other DC-DC converter of the DC excitation module 32 to be in operation or for directly using the AC excitation module 30 to supply power. Furthermore, when the AC power grid has voltage drop or total power down to cause the AC excitation module 30 to work abnormally, the control module 39 can further output the control signal S1 or S2 for enabling the DC-DC converter 323 or 321 in the DC excitation module 32 to be in operation to provide the supply voltage.

By using the excitation control circuit and the electrically excited wind power system having the excitation control circuit according to the present invention, the DC input voltage of the DC-DC converter is provided by each corresponding DC bus capacitance of full-power converters, thus supplying power to the excitation device by the DC-DC converter through a bucking process, so as to implement redundant mechanisms among DC-DC converters. Furthermore, in the present invention, the AC excitation module may also supply power to the excitation device, so as to implement redundancy between excitation power supply manners (i.e., the AC manner from the power grid and the DC manner from the bus capacitance), thus significantly improving the reliability of electrical excitation and the operation stability of the electrically excited wind power system.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. An excitation control circuit used in an electrically excited wind power system, the excitation control circuit comprising:

a plurality of full-power converters, each of the full-power converters comprising:
  a generator-side converter having an AC side and a DC side, wherein the AC side of the generator-side converter is electrically connected to a wind power generator, and the DC side of the generator-side converter is connected to a bus capacitance in parallel; and
  a grid-side converter having an AC side and a DC side, wherein the AC side of the grid-side converter is electrically connected to an AC power grid, and the DC side of the grid-side converter is connected to the bus capacitance in parallel;
a DC excitation module comprising a plurality of DC-DC converters, wherein an input interface of each of the DC-DC converters electrically connected to the bus capacitance of a corresponding full-power converter, an output interface of each of the DC-DC converters is connected in parallel and is electrically connected to an excitation device, and an excitation current required by the wind power generator during excitation is provided by the excitation device; and
a control module used for controlling or switching any one of the DC-DC converters to work normally.

2. The excitation control circuit of claim 1, further comprising an AC excitation module having an excitation switch and a phase-controlled rectifier bridge which are connected in series, wherein the excitation switch is connected to the AC power grid, and an output terminal of the phase-controlled rectifier bridge is connected with an output terminal of the DC excitation module in parallel, and the control module controls the excitation switch to be turned on or off.

3. The excitation control circuit of claim 2, wherein when the AC power grid has voltage drop or power down, the excitation control circuit supplies power to the excitation device through the DC excitation module.

4. The excitation control circuit of claim 1, wherein when one of the DC-DC converters is out of order, the control module outputs a switching control signal, such that the other of the DC-DC converters supplies power to the excitation device.

5. The excitation control circuit of claim 2, wherein when one of the DC-DC converters is out of order, the control module outputs a switching control signal, such that the other of the DC-DC converters supplies power to the excitation device.

6. The excitation control circuit of claim 2, wherein when one of the DC-DC converters is out of order, the control module outputs a switch control signal so as to turn on the excitation switch, such that the AC excitation module is used to supply power to the excitation device.

7. The excitation control circuit of claim 1, wherein an input terminal of each of the DC-DC converters has a filter unit for filtering out voltage disturbance on a cable connected between the bus capacitance and the input terminal.

8. The excitation control circuit of claim 1, wherein a first common-mode rejection unit is further arranged between the AC side of the grid-side converter and the AC power grid, so as to reject a common-mode current.

9. The excitation control circuit of claim 1, wherein a second common-mode rejection unit is further arranged between the AC side of the generator-side converter and the wind power generator, so as to reject a common-mode current.

10. The excitation control circuit of claim 1, wherein a dv/dt rejection unit is further arranged between the AC side of the generator-side converter and the wind power generator, so as to reject a dv/dt voltage.

11. An electrically excited wind power system, comprising a wind power generator and an excitation device, wherein the excitation device is used for providing an excitation current required by the wind power generator during excitation, and the electrically excited wind power system further comprises:
  an excitation control circuit of claim 1.

12. The excitation control circuit of claim 11, further comprising an AC excitation module having an excitation switch and a phase-controlled rectifier bridge which are connected in series, wherein the excitation switch is connected to the AC power grid, and an output terminal of the phase-controlled rectifier bridge is connected with an output terminal of the DC excitation module in parallel, and the control module controls the excitation switch to be turned on or off.

13. The excitation control circuit of claim 12, wherein when the AC power grid has voltage drop or power down, the excitation control circuit supplies power to the excitation device through the DC excitation module.

14. The excitation control circuit of claim 11, wherein when one of the DC-DC converters is out of order, the control module outputs a switching control signal, such that the other of the DC-DC converters supplies power to the excitation device.

15. The excitation control circuit of claim 12, wherein when one of the DC-DC converters is out of order, the control module outputs a switching control signal, such that the other of the DC-DC converters supplies power to the excitation device.

16. The excitation control circuit of claim 12, wherein when one of the DC-DC converters is out of order, the control module outputs a switch control signal so as to turn on the excitation switch, such that the AC excitation module is used to supply power to the excitation device.

17. The excitation control circuit of claim 11, wherein an input terminal of each of the DC-DC converters has a filter unit for filtering out voltage disturbance on a cable connected between the bus capacitance and the input terminal.

18. The excitation control circuit of claim 11, wherein a first common-mode rejection unit is further arranged between the AC side of the grid-side converter and the AC power grid, so as to reject a common-mode current.

19. The excitation control circuit of claim 11, wherein a second common-mode rejection unit is further arranged between the AC side of the generator-side converter and the wind power generator, so as to reject a common-mode current.

20. The excitation control circuit of claim 11, wherein a dv/dt rejection unit is further arranged between the AC side of the generator-side converter and the wind power generator, so as to reject a dv/dt voltage.

* * * * *